Jan. 26, 1960 E. BRASSEUR 2,922,655

SOUND RECORDING AND REPRODUCING APPARATUS

Filed Aug. 22, 1955 3 Sheets-Sheet 1

Jan. 26, 1960 E. BRASSEUR 2,922,655

SOUND RECORDING AND REPRODUCING APPARATUS

Filed Aug. 22, 1955 3 Sheets-Sheet 2

Jan. 26, 1960 E. BRASSEUR 2,922,655

SOUND RECORDING AND REPRODUCING APPARATUS

Filed Aug. 22, 1955 3 Sheets-Sheet 3

United States Patent Office 2,922,655

Patented Jan. 26, 1960

2,922,655

SOUND RECORDING AND REPRODUCING APPARATUS

Eudore Brasseur, Mont-sur-Marchienne, Belgium, assignor to Ateliers de Constructions Electriques de Charleroi, Brussels, Belgium, a corporation of Belgium Application August 22, 1955, Serial No. 529,608

Claims priority, application France December 21, 1954

3 Claims. (Cl. 274—13)

The present invention relates to improvements in sound recording and reproducing devices in which an elongated sound track receiving record is intermittently advanced with a step-by-step movement and the recording and reproducing head moves in alternately reverse directions generally across the record during the periods of rest of the record. The present invention particularly relates to improvements in the mechanism for moving the recording and reproducing head in such device.

The mechanism for moving the sound head according to the present invention is particularly applicable to sound recording and reproducing devices of the electromagnetic type, in which the record incorporates at least a layer of magnetizable material responsive to the head so as to form a sound track on the record when the device is recording and to play back the sound from the sound track when the device is reproducing. Such sound track is of a zigzag shape, with parallel main runs of the sound track extending generally transverse to the length of the record and spaced from each other, such main runs being connected at their ends by short portions extending parallel to the length of the record, the main transverse portions of the sound track being formed by the head during the periods of rest of the record, and the other shorter portions thereof being formed during movement of the record.

In sound recording and reproducing devices of this type it is necessary to have a uniform speed of movement of the head if the device is to yield a high quality of sound recording and reproduction. In most prior devices of this type reciprocation of the head is effected by linkage connecting the head to a rotating electric motor. Since any variation in the speed of the motor directly affects the speed of reciprocation of the head, it was necessary in such prior devices to provide complex mechanisms to compensate for irregularities in the speed of rotation of the motor, thus to obtain a uniform movement of the sound recording and reproducing head.

In accordance with the present invention, a means for reciprocating the recording and reproducing head has as its prime mover a reciprocating member rather than a rotary member. The speed of traverse of the head, which is connected to the reciprocating member, is controlled wholly or in part by a body of liquid which is caused to flow from one end of the cylinder in which the reciprocating member is mounted to the other end of such cylinder. Reciprocation of the head-driving member is, therefore, smooth and cushioned, so that the head is free from any sudden jerky motion which might result if the head-driving member and its linkage were not thus cushioned and controlled. The sound recording and reproducing device of the invention is particularly described below in conjunction with the accompanying drawings, in which:

Figure 1:
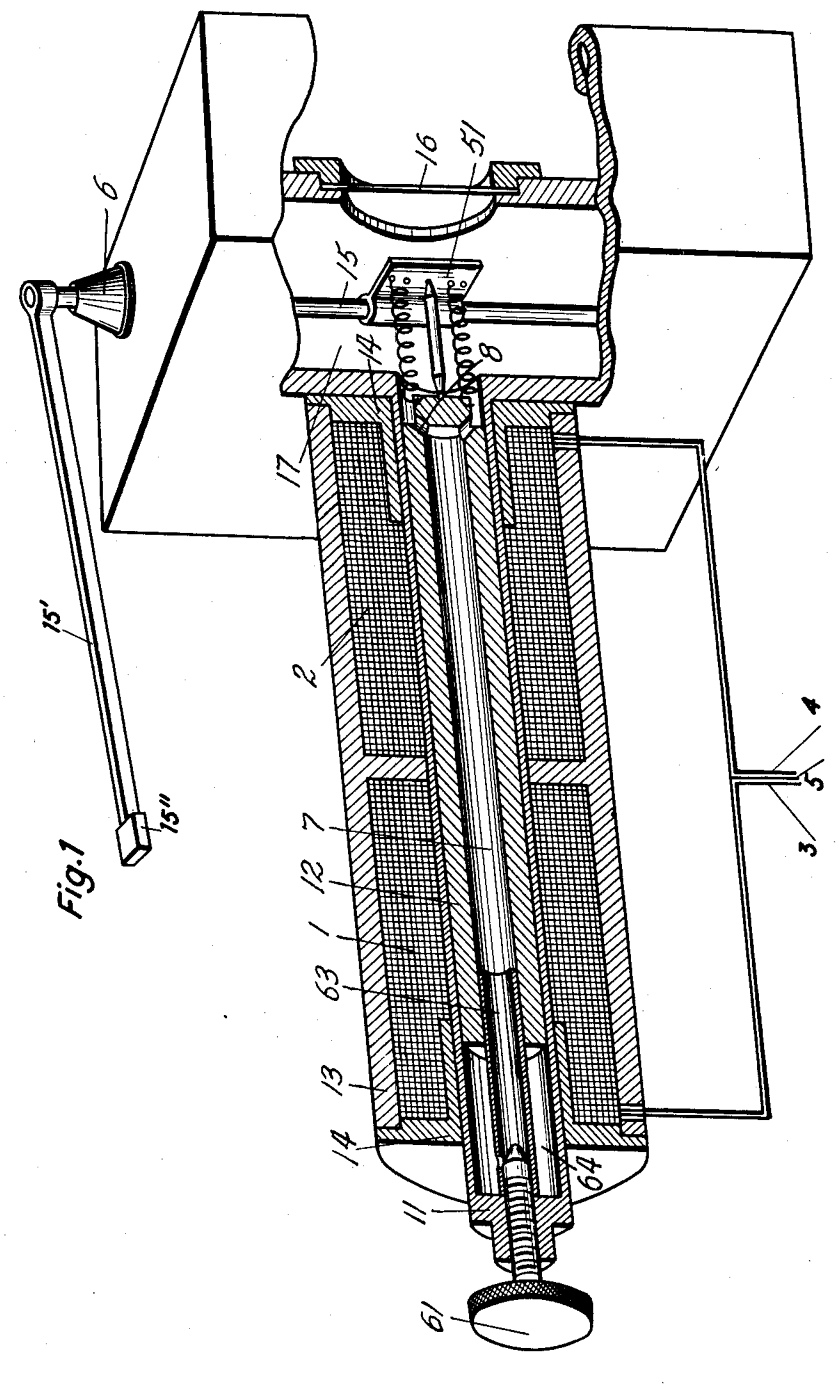
Fig. 1 is a view in perspective of a first embodiment of a prime mover and linkage for reciprocating the sound recording and reproducing head of the device, the solenoid of the prime mover and certain parts of the fluid-containing reservoir in the end thereof being shown in vertical section, some parts of the reservoir being broken away.
Figure 6:
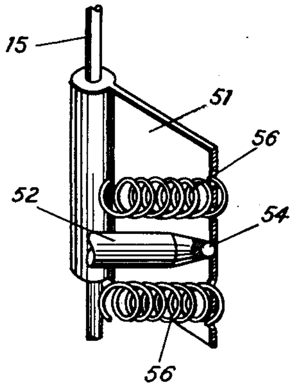
Fig. 6 is an enlarged fragmentary view of the crank arm and portions of the sound head supporting shaft, the connecting rod, and the tension springs of the device of Fig. 1.

The head-moving mechanism of the present invention may be employed to advantage in the sound recording and reproducing device shown in the related United States patent application Serial No. 529,609, filed of even date, which corresponds to the French patent application Serial No. 683,707, filed January 17, 1955, although its use is obviously not restricted thereto. In Figs. 1 and 6 there is shown a vertical shaft 15 which is adapted to be connected to an arm 15′ supporting a sound recording and reproducing head 15″. The head travel is in an arcuate path in reverse directions between two opposite positions upon oscillation of the shaft 15 as hereinafter disclosed. In the embodiment of the mechanism shown in Fig. 1, the shaft 15 is oscillated by a solenoid plunger 12 made of magnetic metal, which travels in one direction when the solenoid coil 1 is energized and which travels in the opposite direction when the solenoid coil 2 is energized. The solenoid coils 1 and 2 are energized, respectively, by circuits consisting of lead wires 3 and 5 and that consisting of lead wires 4 and 5. Such two circuits are alternately energized by switch means, not shown, responsive to movement of the sound recording and reproducing head.

Figures 7, 8:
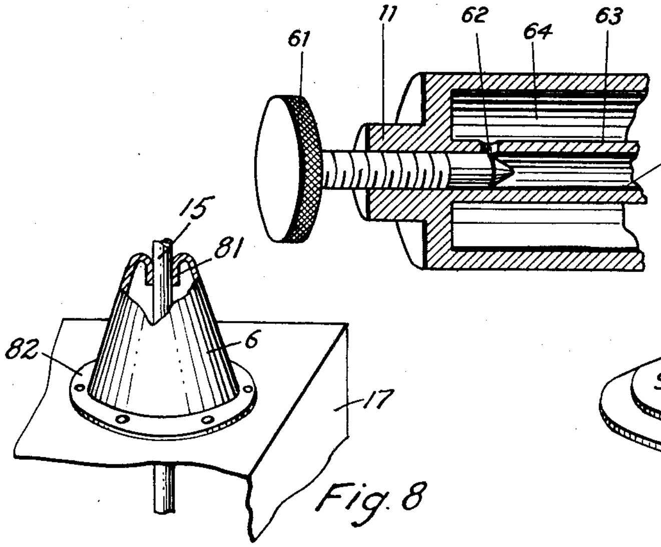
Fig. 7 is a fragmentary view in perspective on an enlarged scale of the liquid-metering valve in the device of Fig. 1.
Fig. 8 is an enlarged view in perspective of the means supporting the shaft which carries the sound head and for effecting a seal between such shaft and the top of the reservoir.

It is essential, in order to obtain uniformity of movement of the head, that the solenoid plunger 12 shall reciprocate at a definite controllable rate. In the embodiment of Fig. 1, control of the rate of reciprocation of the plunger 12 is affected by keeping the solenoid coil energizing voltage constant and by controlling the rate of flow of a liquid into and from a closed end of the cylinder in which the plunger travels. The plunger 12 reciprocates within the tubular body 11 upon which the solenoid coils are wound. The left-hand end (Fig. 1) of tube 11 is, in effect, closed, the other end of the tube 11 being connected, as shown, to the large reservoir 17 which contains a liquid, preferably a lubricating oil of the silicone type. The solenoid plunger 12 has an axial opening 7 there-through which is connected through the angular passages 8 in the right-hand end of the plunger to the space within the reservoir. At the left-hand end of the solenoid, the tubular body 11 is provided with a smaller inwardly projecting axial tube-like portion 63 integral therewith and accurately slidably fitting within the end of passage 7 through the plunger 12. The outer end of tubular portion 63 is provided with a radial passage 62 which connects the interior of member 63 with the smaller reservoir 64 at the left-hand end of the solenoid. The effective area of the passage 62 may be varied by the adjustable axially extending threaded needle valve member 61 as shown in Fig. 7. It will be apparent that when the reservoir 17 is substantially filled with liquid, such liquid will flow into and fill passage 7 in the plunger 12, the bore in member 63, and, when passage 62 is open, the smaller reservoir 64.

The solenoid plunger 12 is retarded in its travel in both directions to a degree depending upon the setting of the needle valve 61. When the plunger is urged to the left, as by energization of solenoid coil 1, the liquid between the left-hand end of the plunger and the cylinder 11 is subjected to pressure and flows to the right through the passage 7 into the reservoir 17. When the plunger 12 is urged to the right, as by the energization of solenoid coil 2, the space between the left-hand end of the solenoid plunger and the cylinder 11 is subjected to decreased pressure, thereby causing liquid from reservoir 17 to flow to the left through passage 7 and into the smaller reservoir 64. It has been found that these two solenoid plunger-speed controlling operations of the mechanism function in substantially the same manner, so that when the needle valve 61 has a given setting to produce the desired speed of travel of the plunger to the left, the speed of travel of the plunger to the right will be the same.

The solenoid plunger 12 is connected to the shaft 15 by a crank arm 51 affixed to the shaft 15, a connecting rod 52 between the right-hand end of the plunger 12 and the crank arm, and coil tension springs 56 extending between the crank arm and the right-hand end of the solenoid plunger, as shown. The crank arm and the right-hand end of the plunger each has a shallow part-spherical confronting seat therein receiving ball-like rounded formations 54 and 53 on the respective ends of the connecting rod 52. It has been found that such connection between the plunger and shaft has little friction and that, by reason of the springs 56, which maintain the crank arm, connecting rod, and plunger tightly in contact at all times, such connection has no lost motion.

It is preferred that the liquid in reservoir 17 and thus in the system as a whole, be constantly subjected to a generally uniform pressure. The rear wall of the reservoir 17 at a level beneath the top of the liquid in the reservoir is provided with a flexible diaphragm 16 of appreciable area. Thus, although the reservoir 17 is sealed, the generally constant atmospheric pressure acting through the flexible diaphragm 16 maintains the liquid in the reservoir under substantially uniform pressure.

In order to avoid the possibility of leakage between the shaft 15 as it passes outwardly through the upper wall of reservoir 17, there is provided a shaft supporting and sealing means 6, more clearly shown in Fig. 8. Means 6 is generally of conical shape and has a horizontal flange 82 at its lower larger end sealed to the upper wall of the reservoir 17. The smaller upper end of means 6 is inturned at 81 parallel to shaft 15 and sealed thereto. Means 6 is preferably made of thin flexible material which is stiff enough to maintain the shaft in the position shown but which will torsionally yield as the shaft 15 is oscillated through a small angle without imposing an undue retarding force on the shaft.

Figure 9:
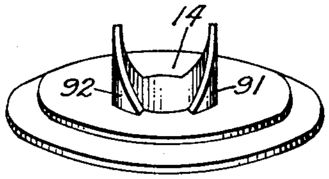
Fig. 9 is a view in perspective of a pole piece preferabyly employed at the ends of the sound head driving solenoid of the device of the invention.

In order to obtain uniform attraction of the solenoid plunger 12 by the solenoid coils 1 and 2, the armature 13 of each solenoid coil 1 and 2 is provided with an end plate 14 having the configuration more clearly shown in Fig. 9. As there shown, the end plate 14 is made up of an annular plate-like body of magnetic material which fits on the end of the solenoid coil coaxial therewith. The body of each member 14 has a central opening therethrough and has two diametrically opposed, peripherally curved, generally triangular members 91 and 92 disposed at the edge of the opening, the broad bases of such triangular members being integral with the body 14. As shown in Fig. 1, the members 91 and 92 on each of members 14 lie coaxial with its respective solenoid and extend inwardly of the windings of the solenoid at the end thereof.

Figure 2:
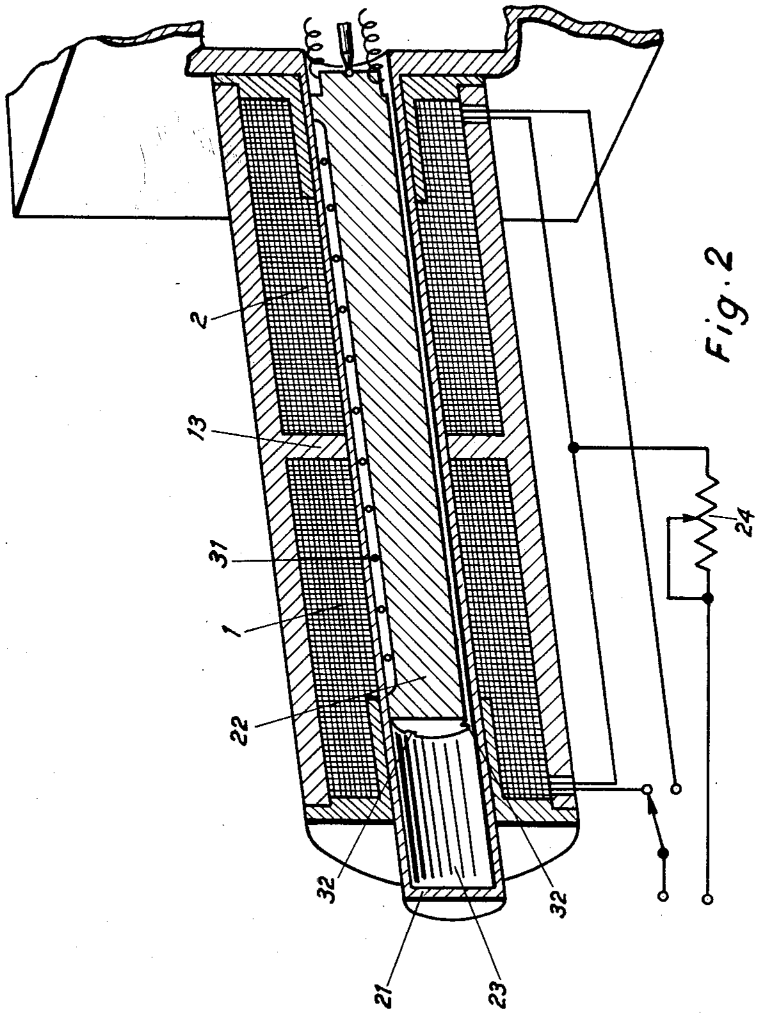
Fig. 2 is a fragmentary view in perspective of a portion of a second embodiment of the prime mover for reciprocating the head of the device of the invention.

In Fig. 2, there is shown a second embodiment of the sound head driving solenoid mechanism. In such mechanism, which is employed with a large liquid reservoir 17 in the same manner as that of Fig. 1, the speed of movement of the solenoid plunger 22 is controlled by adjusting the voltage applied to each of solenoid coils 1 and 2, contained in the armature forming housing 13, by means of the adjustable rheostat 24, the area of the path of the liquid into and out of the small reservoir 23 at the left-hand end of the cylinder 21 being maintained constant.

Figure 3:
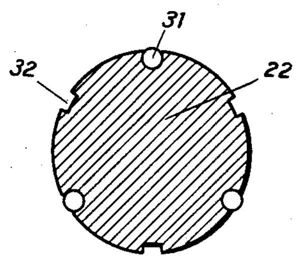
Fig. 3 is a view in vertical transverse section through the solenoid plunger of the device of Fig. 2.

In one embodiment of the solenoid plunger 22, shown in Fig. 3, the plunger is guided in the bore in cylinder 21 by a series of ball bearings 31 located in grooves angularly spaced about the axis of the plunger. The path of flow of the liquid between the small reservoir 23 at the left-hand end of the solenoid plunger and the large reservoir at the right-hand end of the plunger is provided by shallow grooves 32 angularly spaced about the periphery of the plunger.

Figure 4:
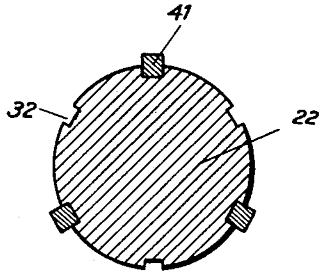
Fig. 4 is a view in vertical transverse section through a further embodiment of a solenoid plunger which may be used in the device of Fig. 2 as an alternative to the plunger of Fig. 3.
Figure 5:
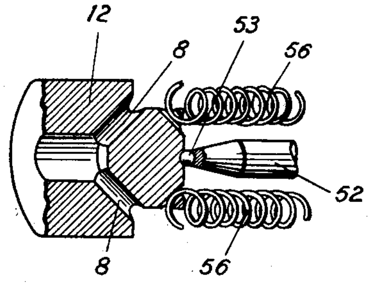
Fig. 5 is an enlarged view of the end of the solenoid plunger nearer the reservoir in the device of Fig. 1, the connecting rod and tension springs being shown in elevation.

In Fig. 4 there is shown a modification of the solenoid plunger 22, such modification having liquid-conducting grooves 32 on its periphery, as in Fig. 3, but being guided in the bore in cylinder 21 by a series of rollers 41 disposed in grooves spaced angularly about the axis of the plunger.

The above-mentioned mechanism of Figs. 1 and 2 may be further modified, if desired, by making the solenoid plunger a permanent magnet, and by using only one, rather than two, solenoid coils cooperating therewith. It is obvious that with such construction the direction of travel of the solenoid plunger will be reversed when the position of the leads of a direct current source to the single solenoid coil is reversed. Further, within the scope of the invention, the path of the liquid into and out of the reservoir at the closed end of the cylinder and connected to the large reservoir may be disposed, if desired, externally of the solenoids.

It has been found that the sound recording and reproducing head-driving mechanism of the present invention is particularly advantageous because of the smoothness of its operation and the ease of adjustment of the speed of the head. The presence of the large volume of liquid in contact with the solenoid plunger and the disposal of the linkage connecting the plunger to the sound head operating arm within the body of such liquid tends to cushion the mechanism and to prevent the transmission of mechanical shocks to the sound head.

While preferred embodiments have been shown by way of example in the drawings and have been particularly described, it will be understood that the invention is in no way limited to such illustrative embodiments.

What I claim and desire to secure by Letters Patent is:

1. In a sound recording and reproducing device wherein a sound track receiving or bearing record is moved step-by-step past a recording and reproducing zone and a sound head is moved in successive reverse directions generally transverse to the direction of movement of the record, the improved mechanism for moving the sound head which comprises a solenoid, a solenoid plunger reciprocable therein, and linkage means substantially free of lost motion connecting the plunger of the solenoid to the sound recording and reproducing head of the device, the solenoid having pole pieces at its ends each of which comprises an annular plate-like body of magnetic material fitting on the end of the solenoid coil coaxial therewith, whereby said plunger is uniformly attracted and reciprocated at a uniform rate of speed, each plate-like body having a central opening therethrough, and diametrically opposed peripherally curved generally triangular members disposed at the edge of the opening and having broad bases integral with the plate-like body, said members lying coaxial with the solenoid and extending inwardly of the windings of the solenoid at the end thereof.

2. In a sound recording and reproducing device according to claim 1, including bearings for slidably mounting said solenoid plunger.

3. In a sound recording and reproducing device wherein a sound track receiving or bearing record is moved step-by-step past a recording and reproducing zone and a sound head is moved in successive reverse directions generally transverse to the direction of movement of the record, an improved mechanism for moving the sound head which comprises a cylinder, a solenoid plunger reciprocable in the cylinder, means comprising two solenoid coils disposed around the plunger to reciprocate said plunger, means connecting the plunger to the sound head of the device to move the head across the record, means defining a passage located radially inward of the solenoid coils from one end of the cylinder to the other, a liquid in the cylinder which flows in reverse directions from one end of the cylinder to the other upon reciprocation of the plunger and means to adjust the speed of travel of the plunger while maintaining a uniform selected speed of travel.

References Cited in the file of this patent

UNITED STATES PATENTS

| | | |
|---|---|---|
| 266,244 | Weston | Oct. 17, 1882 |
| 462,687 | Bruening | Nov. 10, 1891 |
| 796,259 | Sherman | Aug. 1, 1905 |
| 1,093,137 | Keating | Aug. 14, 1914 |
| 1,768,552 | Freeman | July 1, 1930 |
| 1,824,090 | Lord | Sept. 22, 1931 |
| 1,854,667 | Ragen | Apr. 19, 1932 |
| 1,952,876 | Lucy | Mar. 27, 1934 |
| 2,141,541 | Levy | Dec. 27, 1938 |
| 2,363,799 | Mahurin | Nov. 28, 1944 |
| 2,478,625 | Faus | Aug. 9, 1949 |
| 2,572,106 | Burrell | Oct. 23, 1951 |
| 2,615,534 | Blake | Oct. 28, 1952 |
| 2,690,128 | Basilwsky | Sept. 28, 1954 |